Patented Sept. 28, 1937

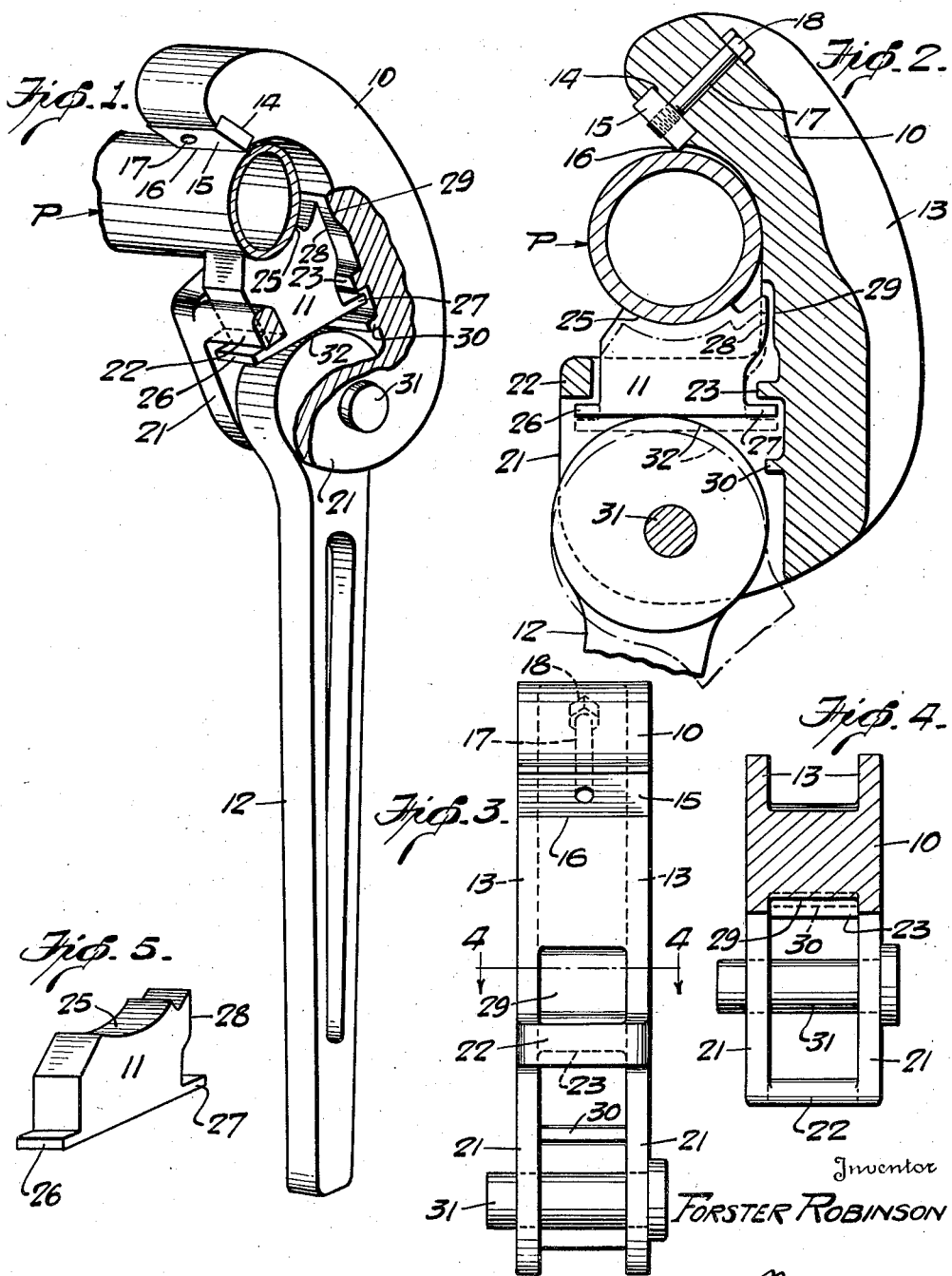

2,094,190

UNITED STATES PATENT OFFICE 2,094,190

PIPE TONGS

Forster Robinson, Lima, Ohio

Application May 28, 1936, Serial No. 82,361

4 Claims. (Cl. 81—128)

The present invention relates to pipe tongs and it is more particularly concerned with non-adjustable pipe tongs of the character used in the oil and natural gas fields, for assembling and disassembling pipe lines.

Although pipe tongs of this general character have been heretofore proposed for this purpose, special problems arising in the field have rendered them ineffective to achieve the result for which they were designed. After the pipes have been in the ground for some time they become rusted, corroded and scaly with the result that they are not only undersize, but also, by reason of their decreased wall section, they are considerably weakened.

In the past it has been the practice to "shim up" by inserting a piece of metal between one of the pipe tong jaws and the surface of the pipe. This procedure entails the expenditure of considerable time and is open to the further serious disadvantage of exerting a tremendous crushing action upon the pipe, with the result that the pipe often collapses under the pressure. The pipe is therefore not only ruined but it is also necessary to disassemble it by other means.

It is accordingly a primary object of my invention to provide pipe tongs which will efficiently handle both new and old pipes irrespective of how badly they may be rusted or corroded, without crushing them.

Another important object is to provide a novel pipe tong which will upon partial actuation firmly grip slightly undersized pipe and upon further actuation maintain its grip on the pipe and impart a turning action thereto.

A further object is to provide a pipe tong having a handle and a pair of jaws, which is so designed that when engaged with an undersized pipe, initial actuation of the handle will cause the jaws to exert a predetermined gripping action upon the pipe, and further actuation of the handle will maintain the predetermined gripping action and will impart a turning action to the pipe.

Another object is to devise a novel pipe tong having but one handle and which involves no gears, pin and slot connections or springs and which will stand up under severe service and not get out of proper working order.

Further objects will become apparent as the specification proceeds in connection with the annexed drawing, and from the appended claims.

In the drawing:

Figure 1 is a perspective view of my improved pipe tong, a portion of the large jaw being broken away to more clearly illustrate the construction;

Fig. 2 is a transverse sectional view through the tong shown in Fig. 1 and shows the jaws engaged with a "new" or full sized pipe;

Fig. 3 is a front elevational view of the tong shown in Fig. 1 as it appears with the handle and sliding jaw removed therefrom;

Fig. 4 is a sectional view taken substantially on the line 4—4 of Fig. 3, and,

Fig. 5 is a perspective view of the sliding jaw employed in my tong.

With continued reference to the drawing, wherein like reference characters have been employed to designate like parts throughout the several views thereof, my improved tong comprises a head or main body member 10, which carries the stationary jaw, a sliding jaw 11, and an operating handle or lever 12.

As seen in Fig. 2, member 10 is of general C-shape so as to fit about the pipe to be gripped and is provided with a pair of longitudinal flanges 13 on its rear face for the purpose of strengthening and lending rigidity to the body. The upper end of the body is provided with a recess 14 having straight or parallel side walls. A pipe gripping bit 15 of hard steel and having a gripping edge 16 and straight or parallel side walls is mounted in recess 14. Secured to bit 15 is a screw or bolt 17, which extends through an opening in body 10 and is threaded into the bit 15, the outer end of this screw having a head 18 thereon for turning it. It is apparent that by turning the screw 17 to tighten it, bit 15 is pulled into intimate engagement with the walls of recess 14 and hence securely held with respect to body 10.

The lower end of body 10 is provided with a pair of spaced flanges 21 between which is defined a guideway for sliding jaw 11 which has a sliding fit therebetween. Flanges 21 are bridged by a member 22 which forms an abutment for the sliding jaw and a similar abutment is provided on body 10 and takes the form of a shallow flange 23.

As seen in Fig. 5, jaw 11 assumes the form of a block having a curved upper face 25 adapted to engage the pipe P and preferably has a radius of curvature similar to that of the pipe for which the tong is designed to handle. Jaw 11 is also provided with a pair of arms 26 and 27 which are adapted to cooperate with abutments 22 and 23 respectively. Jaw 11 is also provided with a bearing face 28 which cooperates with a face 29 provided on body 10 for absorbing the reaction of jaw 11 in response to the turning force applied to handle 12. Face 29 also prevents the jaw from rocking so far as to bind in body 10 when the jaw is retracted. Arm 27 also cooperates with a flange 30 on body 10 to prevent the jaw from dropping too far downwardly when lever 12 is retracted.

Lever 12 is pivoted on a pin 31 which is riveted or otherwise secured in place in flanges 21, and is provided with a rounded end 32, but as it is pivoted off center it constitutes an eccentric cam. When lever 12 is rocked clockwise (Fig. 2) surface 32 engages the bottom of jaw 11 and forces it toward stationary jaw 15.

Taking up the operation of my improved tong, it is fitted over the pipe P as seen in Figs. 1 and 2 and lever 12 is then grasped and turned in a clockwise direction. Initial movement of lever 12 takes up the clearance between jaw 11 and the pipe. Further movement of lever 12 causes jaws 15 and 11 to firmly grip the pipe and this condition is illustrated in Figs. 1 and 2. Application of further turning force to lever 12 causes bit 15 to bite into the pipe and the pressure of the jaws also causes the pipe to undergo a predetermined degree of distortion. Both of these actions tend to decrease the clearance between arms 26 and 27 of jaw 11 and their abutments 22 and 23.

In the present instance a "new" pipe has been illustrated and hence arms 26 and 27 may or may not contact their abutments when sufficient force is applied to lever 12 to turn the pipe.

When a pipe which is undersize, by reason of rust or corrosion, is operated upon the first part of the force applied to lever 12 is utilized to take up clearance between the jaws and the pipe and firmly grip it therebetween. Usually this operation will bring the abutment arms of jaw 11 into engagement with their abutments, with the result that application of further forces to lever 12 merely results in the application of a turning effort upon the pipe, as the abutments prevent the pressure upon the pipe from building up further. I have accordingly provided a tong which will not crush pipes whose walls have been corroded or rusted.

Preferably and as shown, the gripping edge 16 of the bit 15, and the pivot pin 31 of the handle or lever are located in a median line which extends through the center of the pipe and through the center of the jaw 11, whereby the cam action of the eccentric will be brought directly against the plane surface of the jaw 11 and the gripping edge 16 of the bit, the power being thus applied in a straight line and in a direction which is most effective.

The preferred construction has been shown, but it is to be understood that equivalent constructions, embraced by the appended claims, are contemplated.

I claim as my invention:

1. In a pipe tong, a body member having an open-sided recess into which a pipe may be introduced, one side of said recess providing a stationary pipe-gripping jaw, a pair of spaced parallel flanges projecting from a portion of said body partially defining said recess and defining a guideway opening into said recess, a second jaw comprising a block-like element mounted in said guideway for movement toward and away from said stationary jaw, said block being of sufficiently less width than said guideway to provide a loose fit, said block being provided with a pair of abutment faces, an abutment bridging said flanges and a second abutment provided on said body member, said abutments being disposed in the path of movement of the abutment faces of said block in its movement toward said stationary jaw, said abutments being operable to simultaneously engage said abutment faces and stop said second jaw after it has moved a predetermined distance toward said stationary jaw and to prevent binding of said block in said guideway, and an operating lever disposed between said flanges and pivotally supported thereon, said lever having means for engaging and forcing said block toward said stationary jaw when it is rocked in a predetermined direction.

2. A pipe tong comprising a body having a recess for receiving a pipe, a sharpened die mounting in one side of said recess for engaging a pipe acted on by the tong, a movable jaw mounted in said body at such a point that its center of effective effort is substantially diametrically opposite said die with respect to a pipe in the tong, and means pivoted to said body at a point substantially in alignment with said die and the center of effective effort of said movable jaw, said means including a handle for said tong, for camming said movable jaw toward said die to clamp a pipe, in the tong, against said die, the point of contact of said last named means with said movable jaw being substantially in alignment with said die, the center of effective effort of said movable jaw and the pivotal point of said last named means, when a pipe is clamped in said tong, whereby the tong is locked to a pipe clamped therein.

3. In a pipe tong a body member having an open sided recess which may be fitted about a pipe, a stationary jaw secured at one end of said body member and at one end of said recess, a pair of spaced substantially parallel flanges projecting from one side of the other end of said body defining a guide-way and a portion of said recess, said guide-way opening into said recess, a second jaw of less width than said guideway mounted for free sliding movement in said guide-way toward and away from said stationary jaw, an operating lever pivotally supported upon said flanges having a cam portion for engaging said second jaw and urging it toward said stationary jaw when said operating lever is rocked, and abutment means bridging said flanges for engaging and positively arresting said second jaw after it has moved a predetermined distance toward said stationary jaw and for preventing the binding of said second jaw in said guideway.

4. The pipe tong described in claim 3 wherein the stationary jaw comprises a single die characterized by the fact that it presents a sharpened edge to the pipe diametrically opposite the effective center of the movable jaw, with respect to the pipe.

FORSTER ROBINSON.